(12) United States Patent
Liu et al.

(10) Patent No.: US 11,507,457 B2
(45) Date of Patent: Nov. 22, 2022

(54) METHOD, ELECTRONIC DEVICE AND COMPUTER PROGRAM PRODUCT FOR STORAGE MANAGEMENT

(71) Applicant: EMC IP Holding Company LLC, Hopkinton, MA (US)

(72) Inventors: Yousheng Liu, Beijing (CN); Xinlei Xu, Beijing (CN); Jibing Dong, Beijing (CN); Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/531,038

(22) Filed: Nov. 19, 2021

(65) Prior Publication Data

US 2022/0342753 A1    Oct. 27, 2022

(30) Foreign Application Priority Data

Apr. 23, 2021   (CN) .......................... 202110442297.7

(51) Int. Cl.
*G06F 11/00* (2006.01)
*G06F 11/10* (2006.01)
*G06F 11/07* (2006.01)

(52) U.S. Cl.
CPC ........ *G06F 11/1068* (2013.01); *G06F 11/076* (2013.01); *G06F 11/0772* (2013.01); *G06F 11/1004* (2013.01)

(58) Field of Classification Search
None
See application file for complete search history.

(56) References Cited

U.S. PATENT DOCUMENTS

| 8,544,004 | B2* | 9/2013 | Fultheim ............... G06F 9/4411 718/1 |
| 9,524,328 | B2* | 12/2016 | Horowitz .............. G06F 16/275 |
| 10,216,598 | B2 | 2/2019 | Haid et al. |
| 10,223,026 | B2 | 3/2019 | Subrahmanyam et al. |
| 2003/0212864 | A1 | 11/2003 | Hicken et al. |
| 2011/0078112 | A1* | 3/2011 | Takata ................ G06F 16/1748 709/219 |

(Continued)

OTHER PUBLICATIONS

Y. Chang, W. Lu, P. Huang, L. Lee and T. Kuo, "An Efficient FTL Design for Multi-chipped Solid-State Drives," 2010 IEEE 16th International Conference on Embedded and Real-Time Computing Systems and Applications, 2010, pp. 237-246, doi: 10.1109/RTCSA.2010.37. (Year: 2010).*

*Primary Examiner* — Daniel F. McMahon
(74) *Attorney, Agent, or Firm* — BainwoodHuang

(57) ABSTRACT

Techniques involve: writing, when a first disk for dirty page storage has a failure, a first target page description generated by a first node and associated with a first set of target dirty pages of the first node and a second set of target dirty pages of a second node to a first page description storage layer for the first node in a second disk; writing a second target page description generated by the second node and associated with the first set of target dirty pages and the second set of target dirty pages to a second page description storage layer for the second node in the second disk; and restoring, when the failure has been eliminated, the first set of target dirty pages and the second set of target dirty pages in the first disk based on at least one of the descriptions.

15 Claims, 5 Drawing Sheets

(56) References Cited

U.S. PATENT DOCUMENTS

| | | | |
|---|---|---|---|
| 2011/0131568 A1* | 6/2011 | Heim | G06F 9/45558 |
| | | | 718/1 |
| 2012/0011504 A1* | 1/2012 | Ahmad | G06F 12/08 |
| | | | 718/1 |
| 2014/0122803 A1* | 5/2014 | Kato | G06F 12/0891 |
| | | | 711/118 |
| 2015/0205688 A1 | 7/2015 | Haid et al. | |
| 2015/0339058 A1* | 11/2015 | Yoshii | G06F 3/0659 |
| | | | 711/103 |
| 2016/0026489 A1* | 1/2016 | Maislos | G06F 9/45558 |
| | | | 718/1 |
| 2016/0092464 A1* | 3/2016 | Hildebrand | G06F 16/1805 |
| | | | 707/648 |
| 2016/0371145 A1* | 12/2016 | Akutsu | G06F 3/067 |

* cited by examiner

METHOD, ELECTRONIC DEVICE AND COMPUTER PROGRAM PRODUCT FOR STORAGE MANAGEMENT

CROSS-REFERENCE TO RELATED APPLICATION

This application claims priority to Chinese Patent Application No. CN202110442297.7, on file at the China National Intellectual Property Administration (CNIPA), having a filing date of Apr. 23, 2021, and having "METHOD, ELECTRONIC DEVICE AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure generally relate to data processing systems, and more particularly, to a method, an electronic device, and a computer program product for storage management.

BACKGROUND

In some storage systems, dirty data is persisted to a non-volatile random access memory (NVRAM). Once the NVRAM is damaged, the persisted dirty data will be lost.

In the event that the NVRAM cannot work normally, for example, when the NVRAM is powered off, the storage system writes dirty pages and corresponding page descriptors to a disk layer in a solid state drive (SSD). These data can be restored to the NVRAM once the NVRAM works normally. During a current restoration process, the data will be copied directly from a corresponding disk layer of the SSD to the NVRAM without verification and error handling.

SUMMARY OF THE INVENTION

Embodiments of the present disclosure relate to an improved solution for storage management.

In a first aspect of the present disclosure, a method for data processing is provided. The method includes: writing, if it is determined that a first disk for dirty page storage has a failure, a first target page description generated by a first node and associated with a first set of target dirty pages of the first node and a second set of target dirty pages of a second node to a first page description storage layer for the first node in a second disk, the second node being a peer node of the first node; writing a second target page description generated by the second node and associated with the first set of target dirty pages and the second set of target dirty pages to a second page description storage layer for the second node in the second disk; and restoring, if it is determined that the failure of the first disk has been eliminated, the first set of target dirty pages and the second set of target dirty pages in the first disk based at least on one of the first target page description and the second target page description.

In a second aspect of the present disclosure, an electronic device is provided. The electronic device includes: at least one processor; and at least one memory storing computer program instructions, the at least one memory and the computer program instructions being configured to cause, together with the at least one processor, the electronic device to perform actions. The actions include: writing, if it is determined that a first disk for dirty page storage has a failure, a first target page description generated by a first node and associated with a first set of target dirty pages of the first node and a second set of target dirty pages of a second node to a first page description storage layer for the first node in a second disk, the second node being a peer node of the first node; writing a second target page description generated by the second node and associated with the first set of target dirty pages and the second set of target dirty pages to a second page description storage layer for the second node in the second disk; and restoring, if it is determined that the failure of the first disk has been eliminated, the first set of target dirty pages and the second set of target dirty pages in the first disk based at least on one of the first target page description and the second target page description.

In a third aspect of the present disclosure, a computer program product is provided. The computer program product is tangibly stored on a non-volatile computer-readable medium and includes machine-executable instructions. When executed, the machine-executable instructions cause a device to perform the method in the first aspect.

It should be understood that the content described in the Summary of the Invention part is neither intended to limit key or essential features of the embodiments of the present disclosure, nor intended to limit the scope of the present disclosure. Other features of the present disclosure will become readily understood in conjunction with the following description.

BRIEF DESCRIPTION OF THE DRAWINGS

The above and other objectives, features, and advantages of the embodiments of the present disclosure will become easily understandable by reading the following detailed description with reference to the accompanying drawings. In the accompanying drawings, several embodiments of the present disclosure are shown by way of example instead of limitation, where.

Throughout all the accompanying drawings, the same or similar reference numerals are used to indicate the same or similar components.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles and spirits of the present disclosure will be described below with reference to several example embodiments shown in the accompanying drawings. It should be understood that these specific embodiments are described only for the purpose of enabling a person skilled in the art to better understand and then implement the present disclosure, rather than limiting the scope of the present disclosure in any way.

Figure 1:
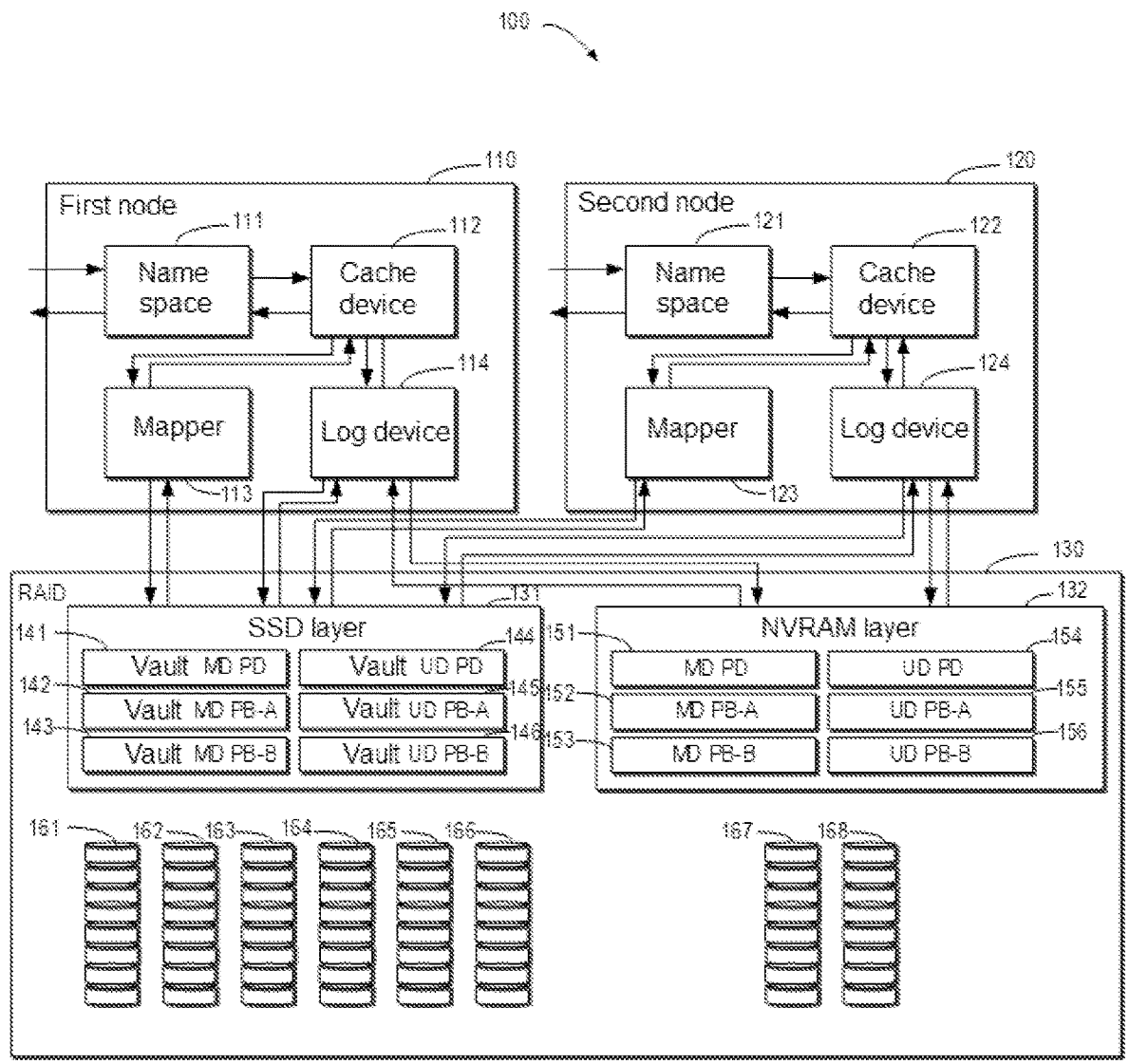
FIG. 1 illustrates a block diagram of an example system in which embodiments of the present disclosure can be implemented.

FIG. 1 illustrates a schematic diagram of example system 100 in which embodiments of the present disclosure can be implemented.

System 100 may include first node 110 and second node 120. First node 110 and second node 120 may be a pair of peer nodes, that is, they have completely corresponding structures and components. First node 110 can be regarded as a primary node in this pair of peer nodes, and second node 120 can be regarded as a secondary node.

First node 110 may include name space 111 for receiving input/output (I/O) requests from users. Name space 111 can be connected to cache device 112. Cache device 112 can be connected to mapper 113 and log device 114 with each other. Mapper 102 is used to map an address in a user request to a physical space where data is stored for the user to read or write data. Log device 114 can, for example, record data being written, modified, or deleted.

Similarly, second node 120 may also include name space 121, cache device 122, mapper 123, and log device 124. The components at second node 120 have the same or substantially the same connection mode and function as the components of first node 110.

System 100 also includes disk array 130. In one example, the disk array may be a redundant array of independent disks (RAID). In an example, disk array 130 may include solid state disk layer (SSD layer) 131 and non-volatile random access memory layer (NVRAM layer) 132. For example, SSD layer 131 may include multiple disks 161 to 166, while NVRAM layer 132 may include disk 167 and disk 168. FIG. 1 illustrates that one SSD layer 131 includes six disks, while one NVRAM layer includes two disks. The above examples are intended to illustrate the present disclosure only and are not intended to limit the present disclosure. In other embodiments, the storage device can be set to include any number of disks as needed.

There are data paths between log device 114 in first node 110 as well as log device 124 in second node 120 and SSD layer 131 as well as NVRAM layer 132, respectively. Dirty pages on first node 110 and second node 120 can be persisted to NVRAM layer 132.

NVRAM layer 132 may include multiple layers associated with dirty page persistence. As shown in FIG. 1, NVRAM layer 132 may include metadata (MD) page descriptor (PD) layer 151, user data (UD) PD layer 154, page buffer (PB) layer 152 for a MD dirty page of the first node, MD dirty page PB layer 153 for the second node, UD dirty page PB layer 155 for the first node, and UD dirty page PB layer 156 for the second node. The page descriptions of the dirty pages associated with the first node and the second node can be persisted to MD PD layer 151 and UD PD layer 154, while the page buffer for the dirty pages associated with the first node and the second node can be persisted to MD dirty page PB layer 152 for the first node, MD dirty page PB layer 153 for the second node, UD dirty page PB layer 155 for the first node, and UD dirty page PB layer 156 for the second node.

Once NVRAM layer 132 is off-line, the system will notify log device 114 in first node 110 and log device 124 in second node 120 of this off-line event. Log device 114 in first node 110 and log device 124 in second node 120 interrupt the data paths with NVRAM layer 132, respectively.

Log device 114 in first node 110 and log device 124 in second node 120 will create on SSD layer 131 a vault layer for saving the persisted dirty pages. For example, MD PD vault layer 141 and UD PD vault layer 144 can be created on SSD layer 131 for saving the persisted page descriptions of the dirty pages associated with the first node and the second node.

In addition, MD dirty page vault PB layer 142 for the first node, MD dirty page vault PB layer 143 for the second node, UD dirty page vault PB layer 145 for the first node, and UD dirty page vault PB layer 146 for the second node can also be created on SSD layer 131 for saving the persisted dirty pages associated with the first node and the second node.

The page descriptions associated with the dirty pages of first node 110 and second node 120 can be saved to created MD PD vault layer 141 and UD PD vault layer 144 during the off-line period of NVRAM layer 132. The dirty pages of first node 110 and second node 120 can be saved to MD dirty page vault PB layer 142 for the first node, MD dirty page vault PB layer 143 for the second node, UD dirty page vault PB layer 145 for the first node, and UD dirty page vault PB layer 146 for the second node.

Once NVRAM layer 132 is restored, log device 114 in first node 110 and log device 124 in second node 120 will restart the data paths with NVRAM layer 132. During the startup process, the stored data will be copied from SSD layer 131 to NVRAM layer 132. After un-vaulting the dirty pages in SSD layer 131, the dirty pages on first node 110 and second node 120 will be directed in accordance with normal data paths.

As described above, the storage system can write dirty pages and corresponding page descriptors to a disk layer in the SSD in the event that the NVRAM cannot work normally. These data can be restored to the NVRAM once the NVRAM works normally. However, during a current restoration process, the data will be copied directly from a corresponding disk layer of the SSD to the NVRAM without verification and error handling.

In addition, for the dual peer-node system illustrated in FIG. 1, during the vault process in the current NVRAM off-line scenario, the primary node (e.g., first node 110 in FIG. 1) saves page descriptors of all dirty pages to a vault layer, while the secondary node (e.g., second node 120 in FIG. 1) does not perform vault on any page descriptors. Each of the primary node and the secondary node protects only the page buffer of its own dirty pages, and neither the primary node nor the secondary node will persist the dirty pages of its peer node even if the peer node cached in that node also has dirty pages. This is not a problem in general, as the dirty pages and their page descriptors have been persisted into the vault layer of the SSD.

However, it may happen that the buffer memory or the data persisted in the SSD is damaged. Since only the primary node saves page descriptors of all dirty pages and each of the primary and secondary nodes only protects the page buffer of its own dirty pages, in the current solution, once the dirty page data of the primary node or the secondary node is damaged, the corresponding data cannot be obtained from the vault layer of its peer node.

In addition, in the un-vault process, the current solution only directly copies the protected data from the SSD layer to the NVRAM layer without any verification or error handling. If the un-vault process fails, all data associated with dirty pages in the layer will be deleted, so in this case, the data associated with the dirty pages will be completely lost.

Therefore, the embodiments of the present disclosure propose a method for storage management. In this method, respective vault layers are created in the SSD layer for the first node and the second node. If it is determined that the NVRAM layer has a failure, page descriptions generated by the first node and associated with dirty pages of the first node and the second node are written to a page description vault layer for the first node in the SSD layer, and page descriptions generated by the second node and associated with the dirty pages of the first node and the second node are written to a page description vault layer for the second node in the SSD layer. In addition, a page buffer vault layer for the first node in the SSD layer stores all dirty pages of the first node and the second node, while a page buffer vault layer for the second node in the SSD layer also stores all dirty pages of the first node and the second node. If it is determined that the NVRAM layer is restored, the dirty pages of the first node and the second node are restored based at least on at least one of the page description generated by the first node and associated with the dirty pages of the first node and the second node and the page description generated by the second node and associated with the dirty pages of the first node and the second node.

In this way, when data associated with dirty pages and saved by one node in the SSD is damaged, the data associated with the dirty pages and saved by its peer node can be used to restore the data, thereby improving the reliability of the storage system and reducing the risk of data loss when the NVRAM drive is off-line or damaged. At the same time, the method can also identify and isolate points of failure during vault and un-vault periods to further improve the reliability of the storage system.

Figure 2:
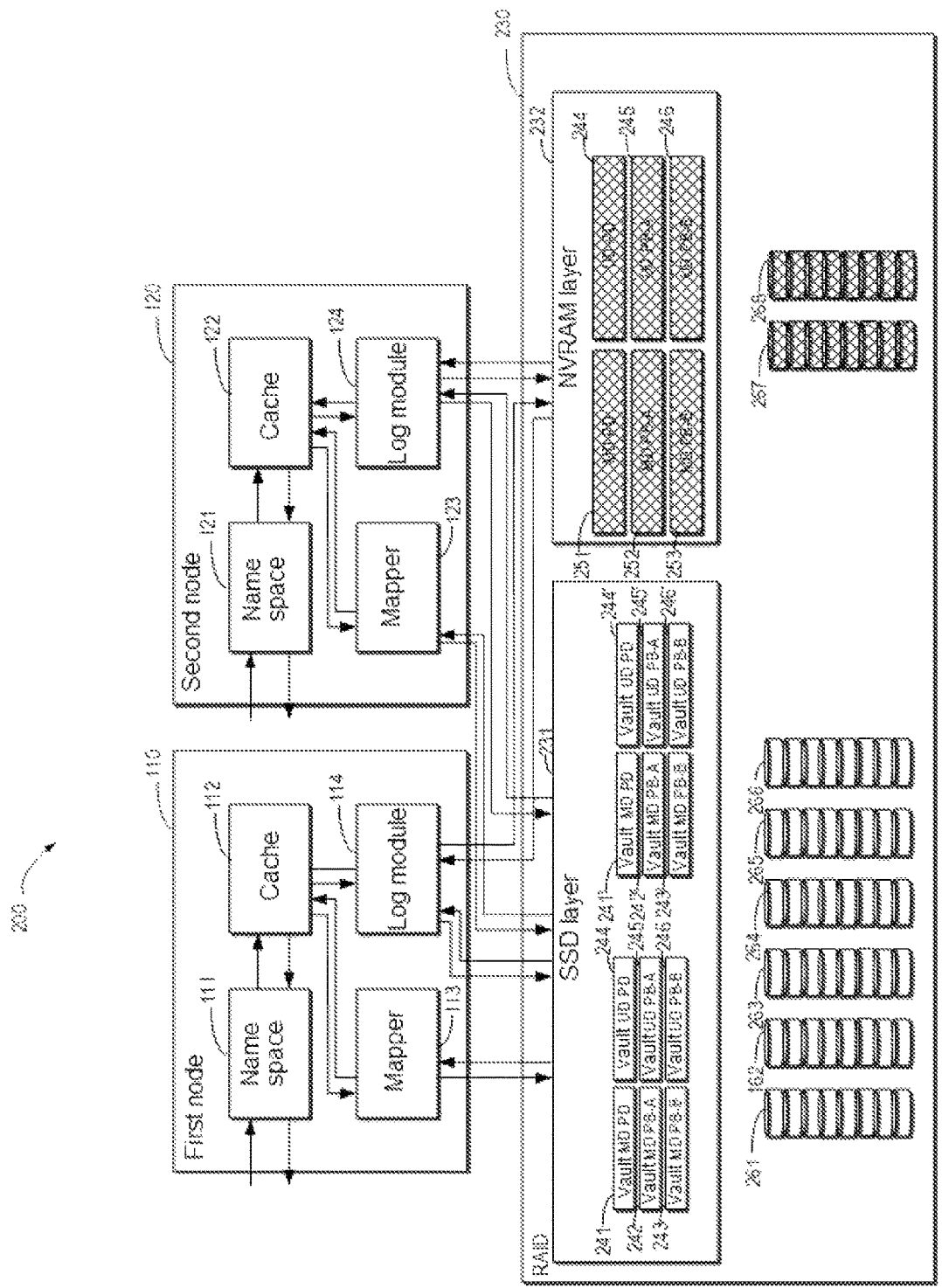
FIG. 2 illustrates a schematic diagram for performing vault according to embodiments of the present disclosure.

FIG. 2 illustrates a schematic diagram for performing vault according to some embodiments of the present disclosure.

In FIG. 2, storage system 200 may include first node 110 already described in connection with FIG. 1 and second node 120 peering with first node 110.

Similar to system 100 shown in FIG. 1, storage system 200 may further include disk array 230. Disk array 230 may include SSD layer 231 and NVRAM layer 232. SSD layer 231 may include multiple disks 261 to 266, while NVRAM layer 232 may include disk 267 and disk 268.

FIG. 2 illustrates that one SSD layer 131 includes six disks, while one NVRAM layer includes two disks. The above examples are intended to illustrate the present disclosure only and are not intended to limit the present disclosure. In other embodiments, the storage device can be set to include any number of disks as needed.

There are data paths between log device 114 in first node 110 as well as log device 124 in second node 120 and SSD layer 231 as well as NVRAM layer 232, respectively. Dirty pages on first node 110 and second node 120 can be persisted to NVRAM layer 232.

NVRAM layer 232 may include multiple layers associated with dirty page persistence. As shown in FIG. 2, NVRAM layer 232 may include MD PD layer 251, UD PD layer 254, MD dirty page PB layer 252 for the first node, MD dirty page PB layer 253 for the second node, UD dirty page PB layer 255 for the first node, and UD dirty page PB layer 256 for the second node. The page descriptions of the dirty pages associated with the first node and the second node can be persisted to MD PD layer 251 and UD PD layer 254, the page buffer for the dirty pages associated with the first node can be persisted to MD dirty page PB layer 252 for the first node and UD dirty page PB layer 255 for the first node, and the page buffer for the dirty pages associated with the second node can be persisted to MD dirty page PB layer 253 for the second node and UD dirty page PB layer 256 for the second node.

Once NVRAM layer 132 is off-line, the system will notify log device 114 in first node 110 and log device 124 in second node 120 of this off-line event. Log device 114 in first node 110 and log device 124 in second node 120 interrupt the data paths with NVRAM layer 232, respectively.

MD PD vault layer 241 and UD PD vault layer 244 can be created on SSD layer 232 for use by first node 110 to store page descriptions of the dirty pages associated with the first node and the second node. Meanwhile, MD PD vault layer 241' and UD PD vault layer 244' can also be created on SSD layer 232 for use by second node 120 to store page descriptions of the dirty pages associated with the first node and the second node.

In addition, MD dirty page vault PB layer 242 for the first node and UD dirty page vault PB layer 245 for the first node that are used by first node 110 to store dirty pages associated with the first node and MD dirty page vault PB layer 243 for the second node and UD dirty page vault PB layer 246 for the second node that are used by first node 110 to store dirty pages associated with the second node can be created on SSD layer 232.

Similarly, MD dirty page vault PB layer 242' for the first node and UD dirty page vault PB layer 245' for the first node that are used by second node 120 to store dirty pages associated with the first node and MD dirty page vault PB layer 243' for the second node and UD dirty page vault PB layer 246' for the second node that are used by second node 120 to store dirty pages associated with the second node can also be created on SSD layer 232.

During the vault process, the page descriptions generated by first node 110 and associated with the dirty pages of first node 110 and second node 120 are written to a page description vault layer for first node 110 in SSD layer 231, i.e., MD PD vault layer 241 and UD PD vault layer 244 of the page descriptions, while the page descriptions generated by second node 120 and associated with the dirty pages of first node 110 and second node 120 are written to a page description vault layers for second node 120 in SSD layer 232, i.e., MD PD vault layer 241' and UD PD vault layer 244'.

In addition, page buffer vault layers for first node 110 in SSD layer 231, i.e., MD dirty page vault PB layer 242 for the first node, UD dirty page vault PB layer 245 for the first node, MD dirty page vault PB layer 243 for the second node, and UD dirty page vault PB layer 246 for the second node, store all dirty pages of first node 110 and second node 120.

Moreover, page buffer vault layers for the second node in SSD layer 231, i.e., MD dirty page vault PB layer 242' for the first node, UD dirty page vault PB layer 245' for the first node, MD dirty page vault PB layer 243' for the second node, and UD dirty page vault PB layer 246' for the second node, also store all dirty pages of first node 110 and second node 120.

That is, six vault layers can be created on SSD layer 232 for first node 110 and second node 120, respectively, and the data stored on the respective vault layers for each node are completely independent.

Taking user data as an example, page descriptors of the user data can be persisted in UD PD vault layer 244 for first node 110 and UD PD vault layer 244' for second node 120. It should be understood that UD PD vault layer 244 for first node 110 persists page descriptors in the memory of first node 110, and UD PD vault layer 244' for second node 120 persists page descriptors in the memory of second node 120. Their contents should be the same under normal circumstances.

The first node's UD dirty page vault PB layer 245 for first node 110 persists all dirty pages of user data possessed by first node 110. The first node's UD dirty page vault PB layer 245' for second node 120 persists dirty page buffer possessed by first node 110 on second node 120. Normally, the data content on the first node's UD dirty page vault PB layer 245' should be the same as that on the first node's UD dirty page vault PB layer 245.

Similarly, the dirty page buffer possessed by second node 120 is also stored on the user data dirty page vault layer for first node 110 and should have the same content as the dirty page buffer stored on the user data dirty page vault layer for second node 120.

For metadata dirty pages on first node 110 and second node 120, the content described above in combination with the user data is also applicable.

In this manner, the data associated with the dirty pages of first node 110 and second node 120 can be stored onto corresponding vault layers for first node 110 and onto corresponding vault layers for second node 120 on SSD layer 231, respectively.

Figure 3:
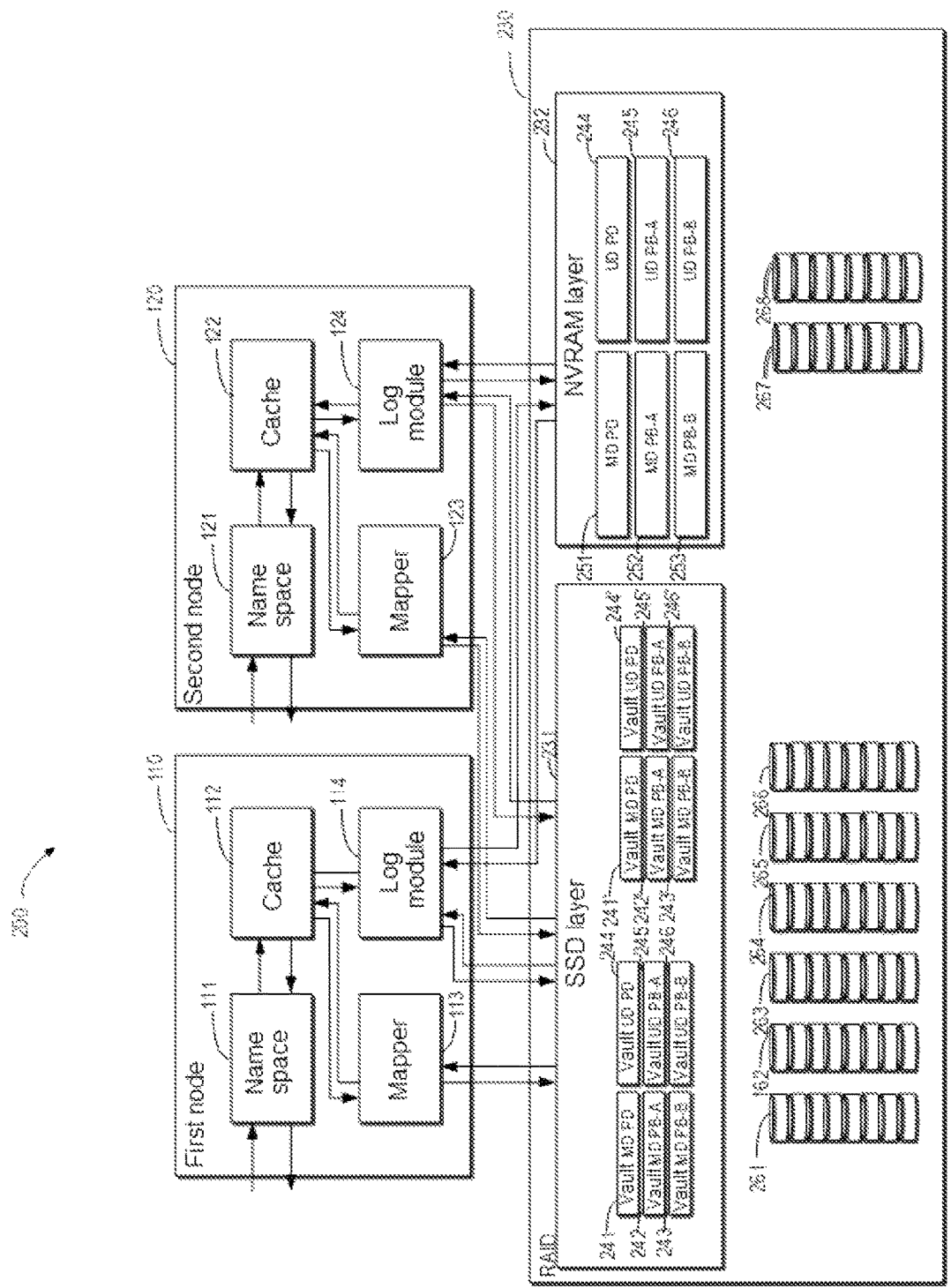
FIG. 3 illustrates a schematic diagram for performing un-vault according to embodiments of the present disclosure.

After NVRAM layer 232 in disk array 230 resumes operation, un-vault can be performed on the data associated with the dirty pages of first node 110 and second node 120 on SSD layer 231. In the process of un-vault, the data associated with the dirty pages of first node 110 and second node 120 needs to be restored to NVRAM layer 232. FIG. 3 illustrates a schematic diagram for performing un-vault according to embodiments of the present disclosure.

In FIG. 3, NVRAM layer 232 in disk array 230 resumes operation. Therefore, un-vault can be performed on the data associated with the dirty pages of first node 110 and second node 120 on SSD layer 231.

In the process of restoring the data associated with the dirty pages of first node 110 on NVRAM layer 232, a first page description of the dirty pages associated with the first node and the second node and stored on MD PD vault layer 241 and UD PD vault layer 244 in the SSD layer can be loaded, and according to a first part of the first page description associated with the dirty pages of the first node in this first page description, a first mapping relationship between the first part of this first page description and the dirty pages of the first node can be determined.

The dirty pages of the first node stored on the first node's dirty page vault PB layer for the first node on SSD layer 231 are acquired, and another page description associated with the dirty pages of the first node is deduced in reverse based on this first mapping relationship.

This another page description can be compared with the first part of the first page description associated with the dirty pages of the first node that is loaded from MD PD vault layer 241 and UD PD vault layer 244 in the SSD layer to determine whether the two match. If it is determined that this another page description matches the first part of the first page description, the dirty pages of the first node stored on the first node's dirty page vault PB layer for the first node on SSD layer 231 are restored to NVRAM layer 232, i.e., data of MD dirty page vault PB layer 242 for the first node on the SSD layer is restored to MD dirty page PB layer 252 for the first node on the NVRAM layer, and the data of UD dirty page vault PB layer 245 for the first node on the SSD layer is restored to UD dirty page PB layer 255 for the first node on the NVRAM layer.

If it is determined that this another page description does not match the first part of the first page description, the second page description of the dirty pages associated with the first node and the second node that is stored on MD PD vault layer 241' and UD PD vault layer 244' on the SSD layer can be acquired.

Based on the first part of the second page description associated with the dirty pages of the first node in the second page description of the dirty pages associated with the first node and the second node, a second mapping relationship between this first part of the second page description and the dirty pages of the first node is determined.

The dirty pages of the first node stored on the first node's dirty page vault PB layer for the second node on SSD layer 231 are acquired, and another page description associated with the dirty pages of the first node is deduced in reverse based on this second mapping relationship.

This another page description can be compared with the first part of the second page description associated with the dirty pages of the first node that is loaded from MD PD vault layer 241' and UD PD vault layer 244' in the SSD layer to determine whether the two match. If it is determined that this another page description matches the first part of the second page description, the dirty pages of the first node stored on the first node's dirty page vault PB layer for the second node on SSD layer 231 are restored to NVRAM layer 232, i.e., data of MD dirty page vault PB layer 242' for the first node on SSD layer 232 is restored to MD dirty page PB layer 252 for the first node on the NVRAM layer, and the data of UD dirty page vault PB layer 245' for the first node on SSD layer 232 is restored to UD dirty page PB layer 255 for the first node on the NVRAM layer.

If it is determined that the another page description still does not match the first part of the second page description, the restoration process fails. The data of the page description associated with the dirty pages of the first node and stored on SSD layer 231 is marked as damaged, and therefore, the dirty pages of the first node are lost.

In the process of restoring the data associated with the dirty pages of second node 120 on NVRAM layer 232, the second page description of the dirty pages associated with the first node and the second node and stored on MD PD vault layer 241' and UD PD vault layer 244' on the SSD layer can be loaded. Based on the second part of the second page description associated with the dirty pages of the second node in the second page description of the dirty pages associated with the first node and the second node, a third mapping relationship between the second part of this second page description and the dirty pages of the second node is determined.

The dirty pages of the second node stored on the second node's dirty page vault PB layer for the second node on SSD layer 231 are acquired, and another page description associated with the dirty pages of the second node is deduced in reverse based on this third mapping relationship.

This another page description can be compared with the second part of the second page description associated with the dirty pages of the second node that is loaded from MD PD vault layer 241' and UD PD vault layer 244' of the SSD layer to determine whether the two match. If it is determined that this another page description matches the second part of the second page description, the dirty pages of the second node stored on the second node's dirty page vault PB layer for the second node on SSD layer 231 are restored to NVRAM layer 232, i.e., data on MD dirty page vault PB layer 243' for the second node on the SSD layer is restored to MD dirty page PB layer 253 for the second node on the NVRAM layer, and data of UD dirty page vault PB layer 246' for the second node on the SSD layer is restored to UD dirty page PB layer 256 for the second node on the NVRAM layer.

If it is determined that this another page description does not match the second part of the second page description, the first page description of the dirty pages associated with the first node and the second node that is stored on MD PD vault layer 241 and UD PD vault layer 244 in the SSD layer can be acquired. Based on the second part of the first page description associated with the dirty pages of the second node in the first page description of the dirty pages associated with the first node and the second node, a fourth mapping relationship between the first part of this second page description and the dirty pages of the second node is determined.

The dirty pages of the second node stored on the second node's dirty page vault PB layer for the first node on SSD layer 231 is acquired, and another page description associated with the dirty pages of the second node is deduced in reverse based on this fourth mapping relationship.

This another page description can be compared with the second part of the first page description associated with the dirty pages of the second node that is loaded from MD PD vault layer 241 and UD PD vault layer 244 of the SSD layer to determine whether the two match. If it is determined that this another page description matches the second part of the first page description, the dirty pages of the second node stored on the second node's dirty page vault PB layer for the first node on SSD layer 231 are restored to NVRAM layer 232, i.e., data on MD dirty page vault PB layer 243 for the second node on the SSD layer is restored to MD dirty page PB layer 253 for the second node on the NVRAM layer, and the data of UD dirty page vault PB layer 246 for the second node on the SSD layer is restored to UD dirty page PB layer 256 for the second node on the NVRAM layer.

If it is determined that the another page description still does not match the second part of the first page description, the restoration process fails. The data of the page description associated with the dirty pages of the second node and stored on SSD layer 231 is marked as damaged, and therefore, the dirty pages of the second node are lost.

In addition, when loading the first page description of the dirty pages associated with the first node and the second node that is stored on MD PD vault layer 241 and UD PD vault layer 244 for the first node on SSD layer 231 or the second page description of MD PD vault layer 241' and UD PD vault layer 244' for the second node on the SSD layer, the validity of the first page description or the second page description can be verified first. Once the validity verification is passed, the first page description or the second page description can be loaded in the process of un-vault.

For example, when loading the first page description of the dirty pages associated with the first node and the second node that is stored on MD PD vault layer 241 and UD PD vault layer 244 on the SSD layer, the validity of the first page description can be verified. For example, a parameter associated with the first page description can be acquired. The parameter may include, for example, a checksum of the first page description, and a magic number, a version number, or a serial number of the first page description.

If it is determined that the first page description of the dirty pages associated with the first node and the second node that is stored on MD PD vault layer 241 and UD PD vault layer 244 on the SSD layer is valid, the first page description is loaded for use in generating the mapping relationships described above.

If it is determined that the first page description of the dirty pages associated with the first node and the second node that is stored on MD PD vault layer 241 and UD PD vault layer 244 on the SSD layer is invalid, the validity of the second page description of the dirty pages associated with the first node and the second node that is stored on MD PD vault layer 241' and UD PD vault layer 244' on the SSD layer can be verified. For example, a parameter associated with the second page description can be acquired. The parameter may include, for example, a checksum of the second page description, and a magic number, a version number, or a serial number of the second page description.

If it is determined that the second page description of the dirty pages associated with the first node and the second node that is stored on MD PD vault layer 241' and UD PD vault layer 244' on the SSD layer is valid, the stored second page description of the dirty pages associated with the first node and the second node can be loaded.

In this way, when data associated with dirty pages saved by one node in the SSD is damaged, data associated with the dirty pages saved by its peer node can be used to restore the data, thereby improving the reliability of the storage system and reducing the risk of data loss when the NVRAM drive is off-line or damaged. At the same time, the method can also identify and isolate points of failure during vault and un-vault periods to further improve the reliability of the storage system.

Figure 4:
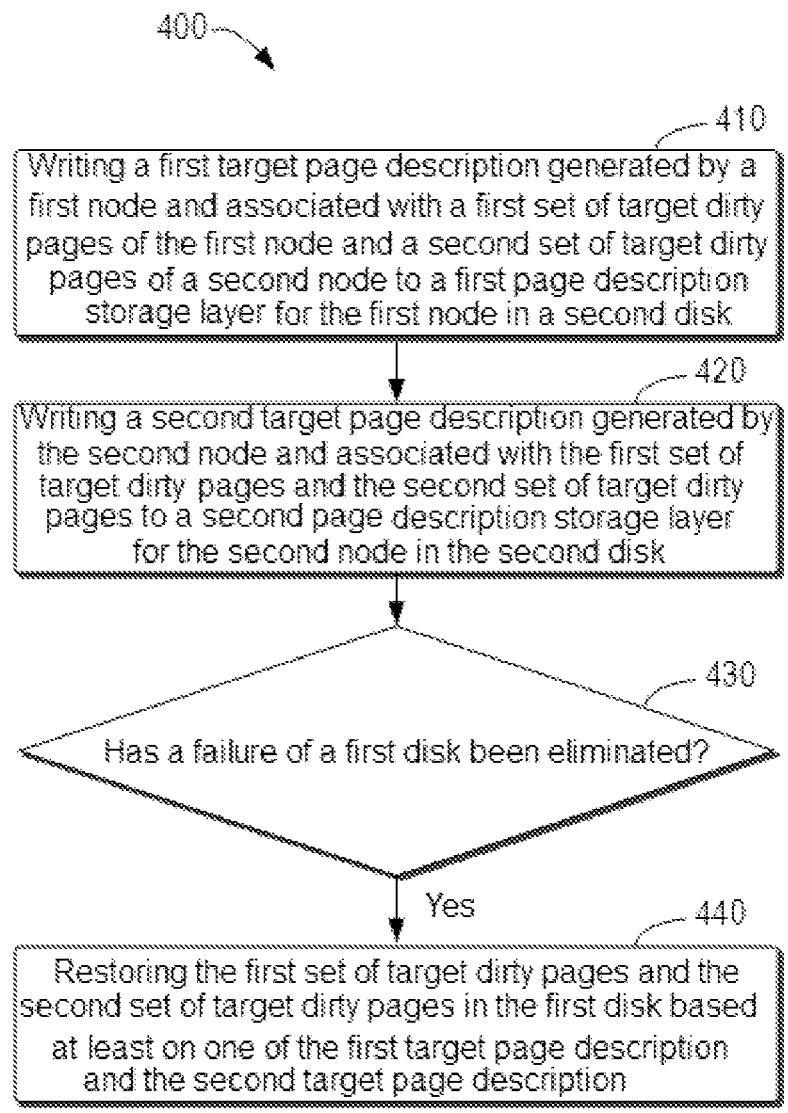
FIG. 4 illustrates a flow chart of a method for storage management according to embodiments of the present disclosure.

FIG. 4 illustrates a flow chart of method 400 for storage management according to embodiments of the present disclosure. Method 400 can be implemented in system 100 shown in FIG. 1. Method 400 can be, for example, implemented by a computing device included in system 100 as shown in FIG. 1. Method 200 can be described with reference to FIG. 1.

As shown in FIG. 4, at block 410, if it is determined that a first disk for dirty page storage has a failure, a computing device writes a first target page description generated by a first node and associated with a first set of target dirty pages of the first node and a second set of target dirty pages of a second node to a first page description storage layer for the first node in a second disk, the second node being a peer node of the first node.

At block 420, the computing device writes a second target page description generated by the second node and associated with the first set of target dirty pages and the second set of target dirty pages to a second page description storage layer for the second node in the second disk.

If it is determined at block 430 that the failure of the first disk has been eliminated, at block 440, the computing device restores the first set of target dirty pages and the second set of target dirty pages in the first disk based at least on one of the first target page description and the second target page description.

In some embodiments, the computing device can generate, based on a set of target page descriptors associated with the first set of target dirty pages in the first target page description, a first mapping relationship between the set of target page descriptors and the first set of target dirty pages. The computing device can determine a set of reference page descriptors based on the first mapping relationship and a first set of reference dirty pages associated with the first node and acquired from a first dirty page storage layer for the first node in the second disk. The computing device can determine whether the set of reference page descriptors match the set of target page descriptors. The computing device can restore the first set of target dirty pages based on the first set of reference dirty pages if it is determined that the set of reference page descriptors match the set of target page descriptors.

In some embodiments, if it is determined that the set of reference page descriptors do not match the set of target page descriptors, the computing device can generate, based on another set of target page descriptors associated with the first set of target dirty pages in the second target page description, a second mapping relationship between the another set of target page descriptors and the first set of target dirty pages. The computing device can determine another set of reference page descriptors based on the second mapping relationship and a second set of reference dirty pages associated with the first node and acquired from a second dirty page storage layer for the second node in the second disk. The computing device can determine whether the another set of reference page descriptors match the another set of target page descriptors. The computing device can restore the first set of target dirty pages based on the second set of reference dirty pages if it is determined that the another set of reference page descriptors match the another set of target page descriptors.

In some embodiments, the computing device can generate, based on a set of target page descriptors associated with the second set of target dirty pages in the second target page description, a third mapping relationship between the set of target page descriptors and the second set of target dirty pages. The computing device can determine a set of reference page descriptors based on the third mapping relationship and a third set of reference dirty pages associated with the second node and acquired from a second dirty page storage layer for the second node in the second disk. The computing device can determine whether the set of reference page descriptors match the set of target page descriptors. The computing device can restore the second set of target dirty pages based on the third set of reference dirty pages if it is determined that the set of reference page descriptors match the set of target page descriptors.

In some embodiments, if it is determined that the set of reference page descriptors do not match the set of target page descriptors, the computing device can generate, based on another set of target page descriptors associated with the second set of target dirty pages in the first target page description, a fourth mapping relationship between the another set of target page descriptors and the second set of target dirty pages. The computing device can determine another set of reference page descriptors based on the fourth mapping relationship and a fourth set of reference dirty pages associated with the second node and acquired from a first dirty page storage layer for the first node in the second disk. The computing device can determine whether the another set of reference page descriptors match the another set of target page descriptors. The computing device can restore the first set of target dirty pages based on the fourth set of reference dirty pages if it is determined that the another set of reference page descriptors match the another set of target page descriptors.

In some embodiments, the computing device can verify the validity of the first target page description based on a parameter associated with the first target page description, the parameter including at least one of the following: a checksum with a set of page description pages included in the first target page description; a magic number of the first target page description, a version number of the first target page description, and a serial number of the first target page description. The computing device can verify the validity of the first target page description based on the parameter; and the computing device can generate the first mapping relationship based on the first target page description if it is determined that the first target page description is valid.

In some embodiments, the computing device can verify, if it is determined that the first target page description is invalid, the validity of the second target page description based on a parameter associated with the second target page description, the parameter including at least one of the following: a checksum with a set of page description pages included in the second target page description; a magic number of the second target page description, a version number of the second target page description, and a serial number of the second target page description. The computing device can generate the first mapping relationship based on the second target page description if it is determined that the second target page description is valid.

Figure 5:
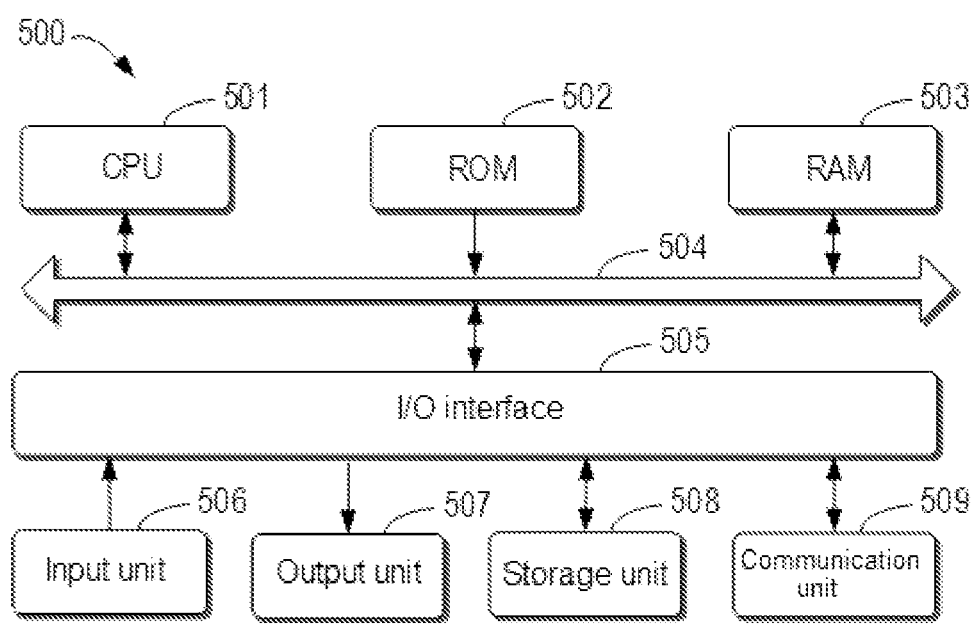
FIG. 5 illustrates a schematic block diagram of a device that can be used to implement embodiments of the present disclosure.

FIG. 5 schematically illustrates a block diagram of device 500 that can be used to implement embodiments of the present disclosure. Device 500 can be implemented as or be included at the computing device included in system 100 of FIG. 1.

As shown in FIG. 5, device 500 includes central processing unit (CPU) 501 that may perform various appropriate actions and processing according to computer program instructions stored in read-only memory device (ROM) 502 or computer program instructions loaded from storage unit 508 into random access memory device (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

Multiple components in device 500 are connected to I/O interface 505, including: input unit 506, such as a keyboard and a mouse; output unit 505, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices through a computer network such as the Internet and/or various telecommunication networks.

The various processes and processing described above, such as process 400, may be performed by processing unit 501. For example, in some embodiments, process 400 may be implemented as a computer software program that is tangibly included in a machine-readable medium, for example, storage unit 508. In some embodiments, part or all of the computer program may be loaded and/or installed to device 500 via ROM 502 and/or communication unit 509. When the computer program is loaded onto RAM 503 and executed by CPU 501, one or more steps of process 400 described above may be performed.

As used herein, the term "include" and similar terms thereof should be understood as open-ended inclusion, i.e., "including but not limited to." The term "based on" should be understood as "based at least in part on." The term "an embodiment" or "the embodiment" should be construed as "at least one embodiment." The terms "first," "second," and the like may refer to different or identical objects. Other explicit and implicit definitions may be further included herein.

As used herein, the term "determine" encompasses a variety of actions. For example, "determine" may include operating, computing, processing, exporting, surveying, looking up (for example, looking up in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

It should be noted that the embodiments of the present disclosure may be implemented by hardware, software, or a combination of software and hardware. The hardware part can be implemented using dedicated logic; the software part can be stored in a memory and executed by an appropriate instruction execution system, such as a micro-processor or dedicated design hardware. Those skilled in the art can understand that the above-mentioned devices and methods can be implemented by using computer-executable instructions and/or by being included in processor control code which, for example, is provided on a programmable memory or a data carrier such as an optical or electronic signal carrier.

In addition, although the operations of the method of the present disclosure are described in a specific order in the drawings, this does not require or imply that these operations must be performed in the specific order, or that all the operations shown must be performed to achieve the desired result. Rather, the order of execution of the steps depicted in the flow charts can be changed. Additionally or alternatively, some steps may be omitted, multiple steps may be combined into one step for execution, and/or one step may be decomposed into multiple steps for execution. It should also be noted that the features and functions of two or more apparatuses according to the present disclosure may be embodied in one apparatus. Conversely, the features and functions of one apparatus described above can be embodied by further dividing the apparatus into multiple apparatuses.

Although the present disclosure has been described with reference to several specific embodiments, it should be understood that the present disclosure is not limited to the specific embodiments disclosed. The present disclosure is intended to cover various modifications and equivalent arrangements included within the spirit and scope of the details disclosed herein.

The invention claimed is:

1. A method for storage management, comprising:
    writing, if it is determined that a first disk for dirty page storage has a failure, a first target page description generated by a first node and associated with a first set of target dirty pages of the first node and a second set of target dirty pages of a second node to a first page description storage layer for the first node in a second disk, the second node being a peer node of the first node;
    writing a second target page description generated by the second node and associated with the first set of target dirty pages and the second set of target dirty pages to a second page description storage layer for the second node in the second disk; and
    restoring, if it is determined that the failure of the first disk has been eliminated, the first set of target dirty pages and the second set of target dirty pages in the first disk based at least on one of the first target page description and the second target page description.

2. The method according to claim 1, wherein restoring the first set of target dirty pages includes:
    generating, based on a set of target page descriptors associated with the first set of target dirty pages in the first target page description, a first mapping relationship between the set of target page descriptors and the first set of target dirty pages;
    determining a set of reference page descriptors based on the first mapping relationship and a first set of reference dirty pages associated with the first node and acquired from a first dirty page storage layer for the first node in the second disk;
    determining whether the set of reference page descriptors match the set of target page descriptors; and
    restoring the first set of target dirty pages based on the first set of reference dirty pages if it is determined that the set of reference page descriptors match the set of target page descriptors.

3. The method according to claim 2, further comprising:
    if it is determined that the set of reference page descriptors do not match the set of target page descriptors, generating, based on another set of target page descriptors associated with the first set of target dirty pages in the second target page description, a second mapping relationship between the another set of target page descriptors and the first set of target dirty pages;
    determining another set of reference page descriptors based on the second mapping relationship and a second set of reference dirty pages associated with the first node and acquired from a second dirty page storage layer for the second node in the second disk;
    determining whether the another set of reference page descriptors match the another set of target page descriptors; and
    restoring the first set of target dirty pages based on the second set of reference dirty pages if it is determined that the another set of reference page descriptors match the another set of target page descriptors.

4. The method according to claim 1, wherein restoring the second set of target dirty pages includes:
    generating, based on a set of target page descriptors associated with the second set of target dirty pages in the second target page description, a third mapping relationship between the set of target page descriptors and the second set of target dirty pages;
    determining a set of reference page descriptors based on the third mapping relationship and a third set of reference dirty pages associated with the second node and acquired from a second dirty page storage layer for the second node in the second disk;
    determining whether the set of reference page descriptors match the set of target page descriptors; and
    restoring the second set of target dirty pages based on the third set of reference dirty pages if it is determined that the set of reference page descriptors match the set of target page descriptors.

5. The method according to claim 4, further comprising:
if it is determined that the set of reference page descriptors do not match the set of target page descriptors, generating, based on another set of target page descriptors associated with the second set of target dirty pages in the first target page description, a fourth mapping relationship between the another set of target page descriptors and the second set of target dirty pages;
determining another set of reference page descriptors based on the fourth mapping relationship and a fourth set of reference dirty pages associated with the second node and acquired from a first dirty page storage layer for the first node in the second disk;
determining whether the another set of reference page descriptors match the another set of target page descriptors; and
restoring the first set of target dirty pages based on the fourth set of reference dirty pages if it is determined that the another set of reference page descriptors match the another set of target page descriptors.

6. The method according to claim 2, wherein generating the first mapping relationship includes:
verifying the validity of the first target page description based on a parameter associated with the first target page description, the parameter including at least one of the following:
a checksum with a set of page description pages included in the first target page description;
a magic number of the first target page description,
a version number of the first target page description,
a serial number of the first target page description; and
verifying the validity of the first target page description based on the parameter; and
generating the first mapping relationship based on the first target page description if it is determined that the first target page description is valid.

7. The method according to claim 6, further comprising:
verifying, if it is determined that the first target page description is invalid, the validity of the second target page description based on a parameter associated with the second target page description, the parameter including at least one of the following:
a checksum with a set of page description pages included in the second target page description;
a magic number of the second target page description,
a version number of the second target page description,
a serial number of the second target page description; and
generating the first mapping relationship based on the second target page description if it is determined that the second target page description is valid.

8. An electronic device, comprising:
a processor; and
a memory coupled to the processor and storing instructions that need to be executed, wherein the instructions, when executed by the processor, cause the electronic device to perform actions including:
writing, if it is determined that a first disk for dirty page storage has a failure, a first target page description generated by a first node and associated with a first set of target dirty pages of the first node and a second set of target dirty pages of a second node to a first page description storage layer for the first node in a second disk, the second node being a peer node of the first node;
writing a second target page description generated by the second node and associated with the first set of target dirty pages and the second set of target dirty pages to a second page description storage layer for the second node in the second disk; and
restoring, if it is determined that the failure of the first disk has been eliminated, the first set of target dirty pages and the second set of target dirty pages in the first disk based at least on one of the first target page description and the second target page description.

9. The device according to claim 8, wherein the first set of target dirty pages are restored by way of:
generating, based on a set of target page descriptors associated with the first set of target dirty pages in the first target page description, a first mapping relationship between the set of target page descriptors and the first set of target dirty pages;
determining a set of reference page descriptors based on the first mapping relationship and a first set of reference dirty pages associated with the first node and acquired from a first dirty page storage layer for the first node in the second disk;
determining whether the set of reference page descriptors match the set of target page descriptors; and
restoring the first set of target dirty pages based on the first set of reference dirty pages if it is determined that the set of reference page descriptors match the set of target page descriptors.

10. The device according to claim 9, wherein the actions further include:
if it is determined that the set of reference page descriptors do not match the set of target page descriptors, generating, based on another set of target page descriptors associated with the first set of target dirty pages in the second target page description, a second mapping relationship between the another set of target page descriptors and the first set of target dirty pages;
determining another set of reference page descriptors based on the second mapping relationship and a second set of reference dirty pages associated with the first node and acquired from a second dirty page storage layer for the second node in the second disk;
determining whether the another set of reference page descriptors match the another set of target page descriptors; and
restoring the first set of target dirty pages based on the second set of reference dirty pages if it is determined that the another set of reference page descriptors match the another set of target page descriptors.

11. The device according to claim 8, wherein the second set of target dirty pages are restored by way of:
generating, based on a set of target page descriptors associated with the second set of target dirty pages in the second target page description, a third mapping relationship between the set of target page descriptors and the second set of target dirty pages;
determining a set of reference page descriptors based on the third mapping relationship and a third set of reference dirty pages associated with the second node and acquired from a second dirty page storage layer for the second node in the second disk;
determining whether the set of reference page descriptors match the set of target page descriptors; and
restoring the second set of target dirty pages based on the third set of reference dirty pages if it is determined that the set of reference page descriptors match the set of target page descriptors.

12. The device according to claim 11, wherein the actions further include:

if it is determined that the set of reference page descriptors do not match the set of target page descriptors, generating, based on another set of target page descriptors associated with the second set of target dirty pages in the first target page description, a fourth mapping relationship between the another set of target page descriptors and the second set of target dirty pages;

determining another set of reference page descriptors based on the fourth mapping relationship and a fourth set of reference dirty pages associated with the second node and acquired from a first dirty page storage layer for the first node in the second disk;

determining whether the another set of reference page descriptors match the another set of target page descriptors; and restoring the first set of target dirty pages based on the fourth set of reference dirty pages if it is determined that the another set of reference page descriptors match the another set of target page descriptors.

13. The device according to claim 8, wherein the first mapping relationship is generated by way of:

verifying the validity of the first target page description based on a parameter associated with the first target page description, the parameter including at least one of the following:

a checksum with a set of page description pages included in the first target page description;

a magic number of the first target page description, a version number of the first target page description, a serial number of the first target page description; and verifying the validity of the first target page description based on the parameter; and generating the first mapping relationship based on the first target page description if it is determined that the first target page description is valid.

14. The device according to claim 13, wherein the actions further include:

verifying, if it is determined that the first target page description is invalid, the validity of the second target page description based on a parameter associated with the second target page description, the parameter including at least one of the following:

a checksum with a set of page description pages included in the second target page description;

a magic number of the second target page description, a version number of the second target page description, a serial number of the second target page description; and generating the first mapping relationship based on the second target page description if it is determined that the second target page description is valid.

15. A computer program product having a non-transitory computer readable medium which stores a set of instructions to perform storage management; the set of instructions, when carried out by computerized circuitry, causing the computerized circuitry to perform a method of:

writing, if it is determined that a first disk for dirty page storage has a failure, a first target page description generated by a first node and associated with a first set of target dirty pages of the first node and a second set of target dirty pages of a second node to a first page description storage layer for the first node in a second disk, the second node being a peer node of the first node;

writing a second target page description generated by the second node and associated with the first set of target dirty pages and the second set of target dirty pages to a second page description storage layer for the second node in the second disk; and restoring, if it is determined that the failure of the first disk has been eliminated, the first set of target dirty pages and the second set of target dirty pages in the first disk based at least on one of the first target page description and the second target page description.

\* \* \* \* \*